United States Patent [19]
Goto et al.

[11] Patent Number: 5,237,423
[45] Date of Patent: Aug. 17, 1993

[54] MULTI-CHIP SOLID-STATE IMAGE SENSING DEVICE

[75] Inventors: Hiroshige Goto; Tetsuya Tada, both of Yokohama, Japan

[73] Assignee: Kabushiki Kaisha Toshiba, Kawasaki, Japan

[21] Appl. No.: 800,266

[22] Filed: Nov. 29, 1991

[30] Foreign Application Priority Data

Nov. 29, 1990 [JP] Japan .................. 2-331684

[51] Int. Cl.$^5$ .............. H04N 3/14; H04N 5/335
[52] U.S. Cl. .............. 358/213.23; 358/213.29; 358/213.31
[58] Field of Search .......... 358/213.29, 213.23, 358/213.11, 213.15, 213.31

[56] References Cited

U.S. PATENT DOCUMENTS

| | | | |
|---|---|---|---|
| 4,617,471 | 10/1986 | Suzuki et al. | 358/213.11 |
| 4,845,567 | 7/1989 | Yamaguchi et al. | 358/213.29 |
| 4,992,653 | 2/1991 | Kawahara et al. | 358/213.19 |
| 5,012,344 | 4/1991 | Goto | 358/213.11 |
| 5,038,214 | 8/1991 | Miida | 358/213.11 |
| 5,097,338 | 3/1992 | Kuriyama et al. | 358/213.31 |

FOREIGN PATENT DOCUMENTS 2-131681  5/1990  Japan .

Primary Examiner—Michael T. Razavi
Assistant Examiner—Wendy R. Greening
Attorney, Agent, or Firm—Foley & Lardner

[57] ABSTRACT

The solid-state image sensing device comprises N-piece photodiodes ($2_i$) for converting optical signals to electric signals; N-piece buffers ($3_i$) for detecting the converted electric signals, respectively; a shift register having a plurality of series-connected transfer stages ($8_i$) for generating a read pulse ($9_i$) on the basis of a control pulse ($8_i$) at a predetermined timing and transmitting another control pulse ($8_{i+}$) to the succeeding stage at another predetermined timing, respectively; a dummy transfer stage ($6_0$) of the same structure as the shift register transfer stages, for transmitting a control pulse ($8_1$) to the first shift register transfer stage in response to an external control pulse ($8_0$) at another predetermined timing; a common output line (10); and N-piece select gates ($5_i$) for outputting a detection signal of the buffer ($3_i$) to the common output line on the basis of the read pulse ($9_i$), respectively. Since control pulses ($8_i$) applied to the respective transfer stages ($6_i$) of the shift register can be generated internally from the dummy transfer stage and the preceding transfer stages of the shift register of the same structure, the waveforms of the control pulses can be equalized, thus improving the S/N ratio of the detected image signals.

1 Claim, 4 Drawing Sheets

MULTI-CHIP SOLID-STATE IMAGE SENSING DEVICE

BACKGROUND OF THE INVENTION

The present invention relates to a solid-state image sensing device, and more particularly to an image sensor provided with an amplification or impedance conversion function for each pixel (picture element).

Conventionally, an image sensor provided with an amplification or impedance conversion function for each pixel has existed as a contact image sensor. This is because the manufacturing process thereof is relatively simple and additionally to output integrating method is simple when integrated as a multichip, when compared with image sensors having other structures (e.g. OCD sensor).

In the conventional image sensors as described above, a plurality of ($N \geq 2$) of photodiodes are formed on a single chip, for instance, and there are arranged thereon source follower buffer circuits, reset gates, select gates, a shift register composed of (N+1)-piece transfer stages of roughly the same structure, and a common output line.

In the above-mentioned conventional image sensor, the respective transfer stages (i=1, 2, ... N+1) of the shift register are driven in response to two different-phase drive pulses $\phi_1$ and $\phi_2$. However, since a control pulse inputted to the first transfer stage of the shift register is supplied externally and control pulses inputted to the second and after transfer stages of the shift register are formed internally on the basis of the drive pulses $\phi_1$ and $\phi_2$, the control pulse applied to the first stage does not necessarily match the waveform of the control pulses applied to the second and after stages of the shift register, in general.

In the case where both the control pulses do not match the waveform of each other, a read pulse generated by the first transfer stage of the shift register is slightly different in waveform from those generated by the second and after transfer stages (i=2, ... N+1) thereof, with the result that the output waveform (e.g. pulse rise time and fall time) of the first pixel is different from the output waveforms of the second and after pixels under the influence of these read pulses, in spite of the fact that output signals of the same waveform must be generated properly. Therefore, when data are sampled at a constant timing, the output waveform from the first pixel differs in waveform from those from the other pixels without generating uniform waveform output, thus resulting in a problem in that the S/N ratio of the image sensor is deteriorated.

SUMMARY OF THE INVENTION

Therefore, the object of the present invention is to provide a solid-state image sensing device which can improve the S/N ratio of the solid image device.

According to the first aspect of the invention, there is provided a solid-state image sensing device integrated on a semiconductor substrate, comprising: N-piece photoelectric sensing elements for converting optical signals to electric signals; N-piece signal detecting means for detecting an electric signal from the i-th (i=1, ... N) photoelectric sensing element, respectively; a shift register having N-piece ($N \geq 2$) series-connected transfer stages, for generating a read pulse on the basis of a control pulse at a predetermined timing and transmitting a control pulse to the succeeding transfer stage at another predetermined timing, respectively; dummy transfer means having at least one ($m \geq 1$) transfer stage of the same structure as that of the respective transfer stages of the shift register, for transmitting a control pulse to the first transfer stage of the shift register in response to an externally applied control pulse at another predetermined timing; a common output line; and N-piece switching means for outputting a detection output of the i-th signal detecting means to the common output line, respectively on the basis of a read pulse transmitted from the i-th transfer stage of the shift register.

According to the first aspect of the solid-state image device of the present invention, the control pulses transmitted to the respective transfer stages of the shift register are formed internally by a dummy transfer stage of the same structure or the preceding transfer stages, respectively. Therefore, the read pulses outputted from the respective transfer stages are roughly the same in waveform, so that it is possible to prevent the S/N ratio of the image sensor from being deteriorated.

According to the second aspect of the invention, there is provided a multichip solid-state image sensing device, wherein L ($\geq 2$)-piece solid image devices as described above are arranged in series and which comprises applying means for applying a pulse in phase with a control pulse transmitted from an (N-m)th transfer stage of the shift register of the i-th (i=1, ... L-1) solid image device to the first stage of the dummy transfer stage of the (i+1)th solid image device as a control input; and an integrated output line for integratedly outputting signals outputted from the respective solid image devices via the common output lines.

According to the second aspect of the solid image device of the present invention, a pulse in phase with the control pulse transmitted from the (N-m)th transfer stage of the shift register of the i-th solid image device is applied to the first stage of the dummy transfer stage of the (i+1)th solid image device as the input control pulse. Accordingly, since the read pulses outputted from the respective transfer stages of the solid image device are roughly the same in waveform, thus enabling the prevention of deterioration of the S/N ratio of the solid image device.

DESCRIPTION OF THE PREFERRED EMBODIMENTS

Figure 1:
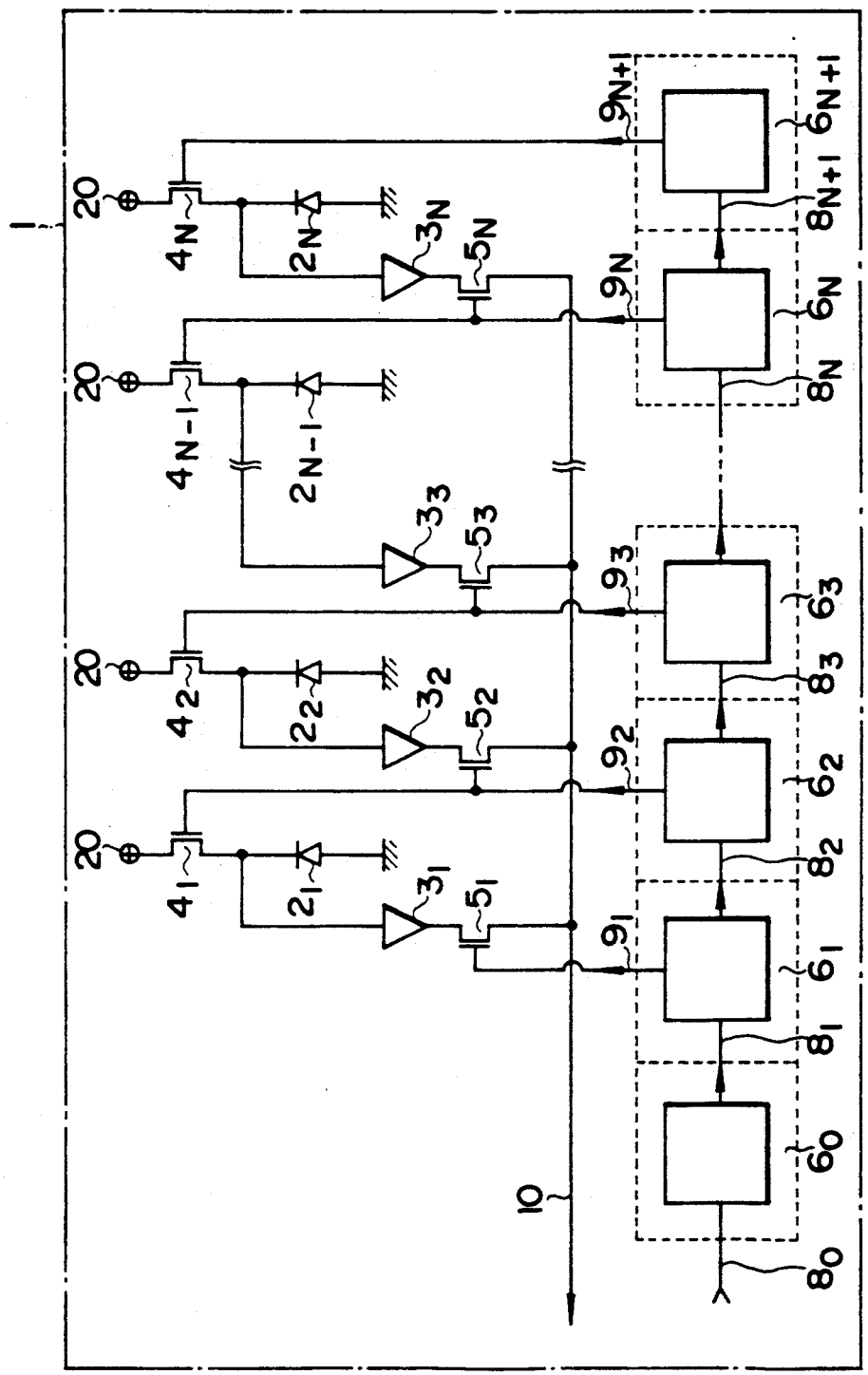
FIG. 1 is a block diagram showing a first embodiment of the solid image device according to the present invention.

A first embodiment of the solid image device according to the present invention will be described hereinbelow with reference to FIG. 1.

The image sensor of this embodiment formed on a single chip 1 is provided with a plurality ($N \geq 2$) of photodiodes $2_1 \ldots 2_N$, buffer circuits (e.g. source follower) $3_1 \ldots 3_N$, reset gates $4_1 \ldots 4_N$, select gates $5_1$ .

... $5_N$, a shift register formed with (N+1) transfer stages $6_1 \ldots 6_{N+1}$ of the same structure, and a common output line 10. In addition, the shift register is provided with a dummy transfer stage $6_0$ of the same structure as that of the respective transfer stages $6_i (i=1, \ldots N+1)$ in front of the transfer stage $6_1$.

The operation of the image sensor shown in FIG. 1 will be described hereinbelow with reference to FIG. 2. The respective transfer stages $6i (i=1, \ldots N+1)$ of the shift register are driven by two different-phase drive pulses $\phi_1$ and $\phi_2$. The first transfer stage $6_1$ transmits a read pulse $9_1$ synchronized with the drive pulse $\phi_1$ to the select gate $5_1$ on the basis of a control pulse $8_1$ at a constant period, and further transmits a control pulse $8_2$ synchronized with the drive pulse $\phi_2$ to the second transfer stage $6_2$. Further, the transfer stage $6_i (i=2, \ldots N)$ transmits a read pulse $9_i$ synchronized with the drive pulse $\phi_1$ to the select gate $5_i$ and a reset gate $4_{i-1}$ on the basis of the control pulse $8_i$ transmitted from the preceding transfer stage $6_{i-1}$, and further transmits a control pulse $8_{i+1}$ synchronized With the drive pulse $\phi_2$ to the succeeding transfer stage $6_{i+1}$. In addition, the final transfer stage $6_{N+1}$ transmits a read pulse $9_{N+1}$ synchronized with the drive pulse $\phi_1$ to the reset gate $4_N$ on the basis of the control pulse $8_{N+1}$ transmitted by the transfer stage $6_N$. The control pulse output terminal of this transfer stage $6_{N+1}$ is kept opened. The dummy transfer stage $6_0$ is driven by the drive pulse $\phi_1$ and $\phi_2$ in the same way as the respective transfer stages $6_i (i=1, \ldots N+1)$, and transmits a control pulse $8_1$ synchronized with the drive pulse $\phi_2$ to the transfer stage $6_1$ on the basis of the control pulse $8_0$ transmitted from the external circuit.

While the read pulse $9_{i+1}$ is kept at ON level, the output terminal potential of the photodiode $2_i (i=1, \ldots N)$ is initialized by a reset drain voltage applied from a voltage supply 20 to the reset gate $4_i$, and then drops according to the intensity of incident light. This voltage drop is detected by the buffer $3_i$. After an integral duration which corresponds to the ON-level duration of the control pulse $8_i$ has elapsed, the voltage detected by the buffer $3_i$ is generated at the common output line 10 as long as the read pulse $9_i$ is at ON level. Thereafter, a control pulse $8_{i+1}$ is transmitted to the transfer stage $6_{i+1}$, and a read pulse $9_{i+1}$ is generated from this transfer stage $6_{i+1}$, so that the output terminal of the photodiode $2_i$ is initialized again. The above operation is repeated so that the signal from the photodiode $2_i$ is outputted to the common output line 10 when the read pulse $9_i (i=1, \ldots N+1)$ is kept generated, and the signal from the photodiode $2_{i+1}$ is outputted to the common output line 10 when the read pulse $9_{i+1}$ is kept generated. Therefore, signals are generated from the photodiodes $2_1 \ldots 2_N$ to the common output line in time series fashion. Here, the one which includes the photodiode $2_i$, the buffer $3_i$, the reset gate $4_i$ and the select gate $5_i$ is referred to as a pixel, hereinafter.

As described above, since the waveforms of the control pulses $8_i$ inputted into the respective transfer stages $6_i (i=1, \ldots N+1)$ are allowed to be roughly the same, it is possible to prevent the S/N ratio from being deteriorated. Further, in the above description, it is not necessarily required that the dummy transfer stage $6_0$ generate a read pulse synchronized with the drive pulse $\phi_1$. Further, in the above embodiment, only the single dummy transfer stage has been explained by way of example. However, the similar effect can be obtained when a plurality of dummy transfer stages are arranged.

The second embodiment of the solid image device according to the present invention will be described with reference to FIG. 3.

Figure 2:
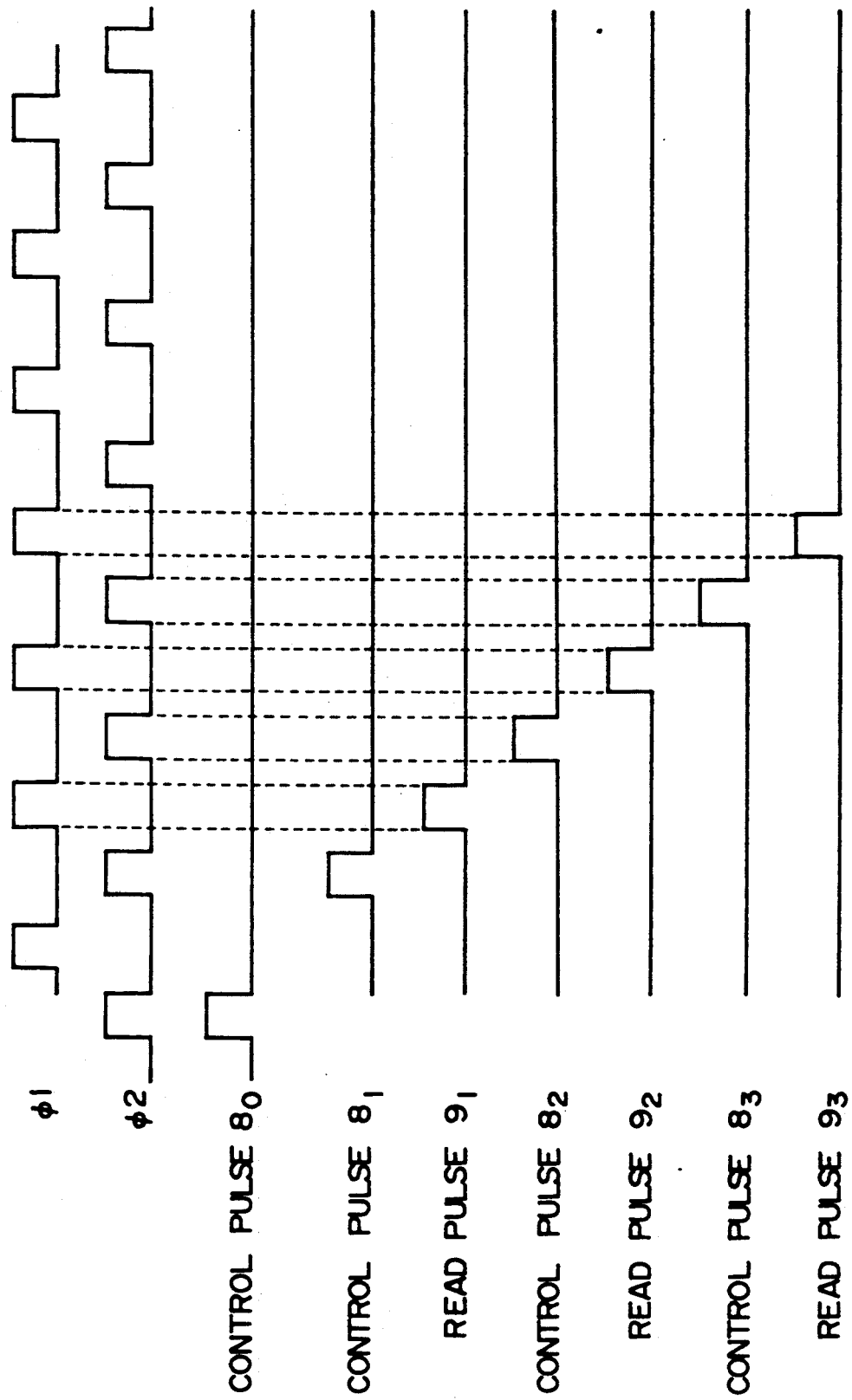
FIG. 2 is a timing chart for assistance in explaining the operation of the device shown in FIG. 1.

This embodiment relates to a so-called multichip image sensor such that a plurality of solid image devices as shown in FIG. 1 are arranged in series with each other. In FIG. 3, a single chip is designated by a numeral 100 or 200. On the chip 100, there are formed pixels $101_i (i=1, \ldots N)$, a dummy transfer stage $106_0$, a shift register including transfer stages $106, 106_{N+1}$, and an output buffer 115 for transmitting a control pulse. On the chip 200, similarly there are arranged pixels $201_i$ (i=1, N), a dummy transfer stage $206_0$, a shift register including transfer stages $206, \ldots 206_{N+1}$, and an output buffer (not shown) for transmitting a control pulse. Each of the pixels $101_i$ and $201_i$ comprises the photodiode $2_i$, the buffer $3_i$, the reset gate $4_i$ and the select gate $5_i$ as shown in FIG. 1. The dummy transfer stages $106_0$ and $206_0$ and the transfer stages $106_i$ and $206_i (i=1, \ldots N+1)$ are driven by two different-phase drive pulses $\phi_1$ and $\phi_2$, respectively. The dummy transfer stage $106_0$ transmits a control pulse $108_1$ synchronized with the drive pulse $\phi_2$ to the transfer stage $106_1$ on the basis of the control pulse $108_0$ applied from the external circuit. The transfer stage $106_i (i=1, \ldots N)$ transmits read pulse $109_1$ synchronized with the drive pulse $\phi_1$ to a select gate of the pixel $101_1$ on the basis of the control pulse $108_1$ transmitted from the dummy transfer stage $106_0$. Further, the transfer stage $106_i (i=2, \ldots N)$ transmits the read pulse $109_i$ synchronized with the drive pulse $\phi_1$ to the reset gate of the pixel $101_{i-1}$ and the select gate of the pixel $101_i$ on the basis of the control pulse $108i$ transmitted by the preceding transfer stage $106_{i-1}$, and transmits a control pulse $108_{i+1}$ synchronized with the drive pulse $\phi_2$ to the succeeding transfer stage $106_{i+1}$. The final transfer stage $106_{N+1}$ transmits a read pulse $109_{N+1}$ synchronized with the drive pulse $\phi_1$ to the reset gate of the pixel $101_N$ on the basis of the control pulse $108_{N+1}$. The pulse transmitting output buffer 115 is of high input impedance and low impedance characteristics, and transmits the control pulse $108_N$ transmitted from the transfer stage $106_N$ to the dummy transfer stage $206_0$ formed on the chip 200. The composing elements (e.g. transfer stages $106_i (i=1, \ldots N+1)$, pixels $101_i$ (i=1, \ldots N), etc.) other than the dummy transfer stage $206_0$ formed on the chip 200 are provided with functions the same as those of the corresponding composing elements (e.g. transfer stages $206_i (i=1, \ldots N+1)$, pixels $201_i (i=1, \ldots N)$, etc.) arranged on the chip 100.

Figure 4:
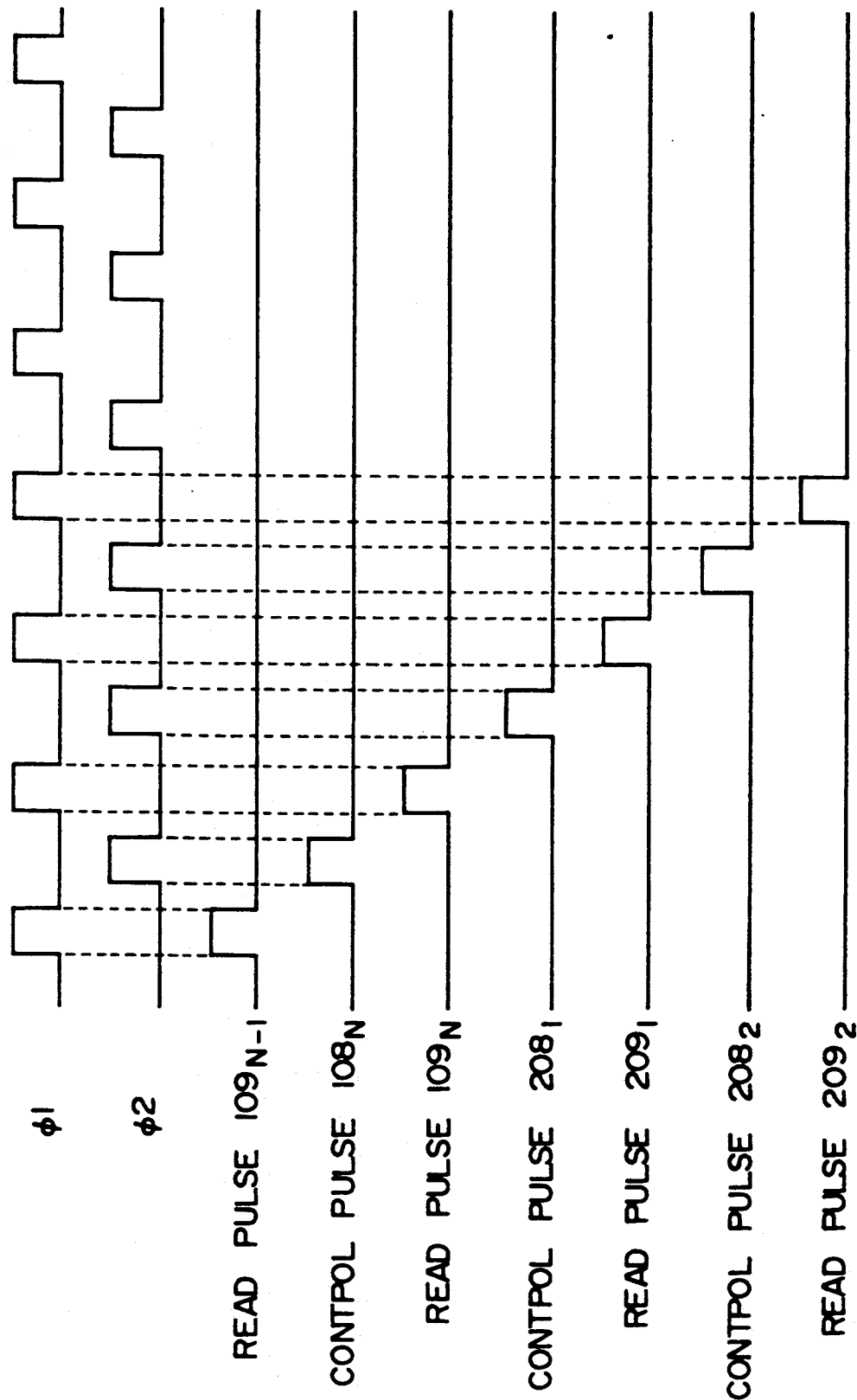
FIG. 4 is a timing chart for assistance in explaining the operation of the device shown in FIG. 3.

The operation of this second embodiment will be described thereinbelow with reference to FIG. 4. When the control pulse $108_0$ transmitted from the external circuit is inputted to the dummy transfer stage $160_0$, the control pulse $108_1$ synchronized with the drive pulse $\phi_2$ is transmitted from this dummy transfer stage $106_0$ to the transfer stage $106_1$. Therefore, since the read pulse $109_1$ synchronized with the drive pulse $\phi_1$ is transmitted from the transfer stage $106_1$ to the select gate of the pixel $101_1$, an image signal is generated at the output line 110 of the chip 100 from the pixel $101_1$ according to the intensity of light incident upon the pixel $101_1$. Thereafter, the control pulse $108_2$ synchronized with the drive pulse $\phi_2$ is transmitted from the transfer stage $106_1$ to the transfer stage $106_2$. On the basis of this control pulse $108_2$, the read pulse $109_2$ is transmitted from the transfer stage $106_2$ to the reset gate of the pixel $101_1$ and the select gate of the pixel $102_i$, so that a signal is generated from the pixel $101_2$ to the output line 110. The above-mentioned operation is repeated, so that signals are generated from the pixels $101_i (i=1, \ldots N)$ to the output line 110 in time series fashion, i-n the same way as with the case of the first embodiment. On the other hand, in the above-mentioned operation, when the control pulse $108_N$ is generated from the transfer stage $106_{N-1}$ this control pulse $108_N$ is transmitted to both the transfer stage $106_N$ and the buffer 115. Therefore, the control pulse $208_0$ is transmitted from the buffer 115 to the dummy transfer stage $206_0$ on the chip 200, with the result that the chip 200 operates in the same way as the chip 100 (see FIG. 5). At this moment, the timing at which the control pulse $208_1$ is generated from the dummy transfer stage $206_0$ matches the timing at which the control pulse $108_{N+1}$ is generated from the transfer stage $106_N$ to the transfer stage $106_{N+1}$ on the chip 100.

After time serial signals are generated from the pixels $101_1 \ldots 101_N$ to an integrated output line 999 via the output line 110 in accordance with the above-mentioned operation, time serial signals are generated from the pixels $201_1 \ldots 201_N$ to the integrated output line 999 via the output line 210 of the chip 200. Owing to the above-mentioned operation, the signal processing can be simplified in spite of the multichip structure. Further, in this second embodiment, the same effect as with the case of the first embodiment shown in FIG. 1 can be of course obtained.

Figure 3:
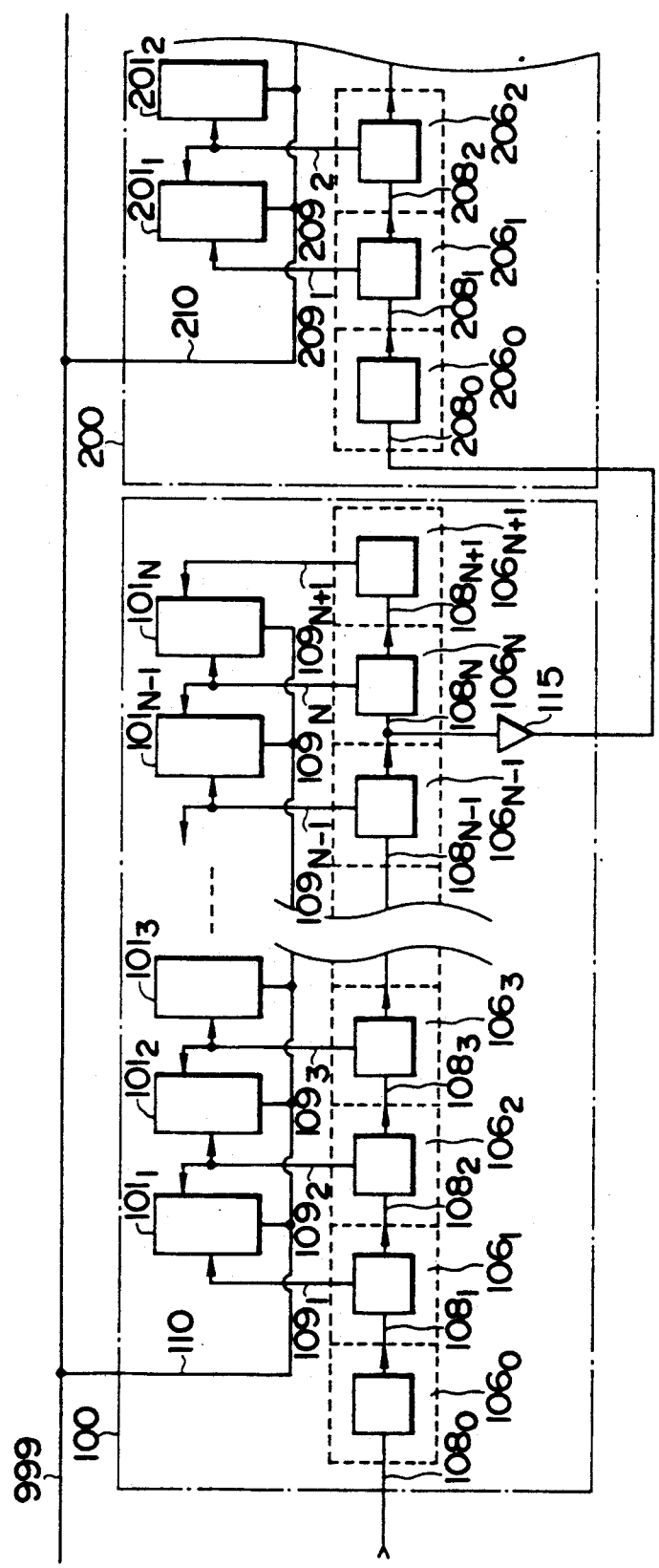
FIG. 3 is a block diagram showing a second embodiment of the solid image device according to the present invention.

In the embodiment shown in FIG. 3, an image device composed of 2 chips has been explained by way of example. Without being limited thereto, it is of course possible to realize an image device of three or more chips. Further, in FIG. 3, the image device including a single dummy transfer stage has been explained. However, it is of course possible to incorporate a plurality of dummy transfer stages therein by adjusting the input branch positions to the pulse transmitting output buffer. In more detail, assuming that the number of the dummy transfer stages on one chip is m and the number of transfer stages of the shift register except the dummy transfer stages on the other chip in front of the one chip is n, the control pulse outputted from the (n−m)th transfer stage of the shift register is inputted to the input terminal of the pulse transmitting output buffer.

As described above, in the solid image device according to the present invention, it is possible to prevent the deterioration of the S/N ratio of the image signals.

What is claimed is:

1. A multi-chip solid-state image sensing device, comprising:
    an integrated output line; and
    a plurality of $(L(\geq 2))$ of solid-state image sensing chips arranged in series, an i-th $(i=1, 2, \ldots L)$ solid-state image sensing chip comprising
    $N(\geq 2)$ photoelectric sensing elements for converting optical signals to electric signals;
    N signal detecting means for detecting an electric signal from the corresponding photoelectric sensing elements, respectively;
    transfer means having a shift register with (N+1) series-connected transfer stages, for generating a read pulse on the basis of a control pulse and for transferring the control pulse to a succeeding transfer stage, respectively;
    dummy transfer means having m $(m \geq 1)$ transfer stages and having the same structure as that of the transfer stages of said shift register, for transmitting the control pulse received from a previous (i−1) the solid-state image sensing chip to a first transfer stage of the i-th solid-state image sensing chip in response to the control pulse;
    N switching means for outputting a detection output of an i-th signal detecting means to a common output line, respectively on the basis of the read pulse transmitted from an i-th transfer stage of said shift register; and
    applying means for applying a pulse in phase with the control pulse transmitted from a (N−m)th transfer stage of the shift register of the i-th $(i=1, \ldots L-1)$ solid-state image sensing chip to a first stage of the transfer means of an (i+1)the solid-state image sensing chip as a control input,
    wherein said integrated output line integratedly outputs signals outputted from the respective common output line of the solid-state image sensing chips.

* * * * *